(12) United States Patent
Pyles et al.

(10) Patent No.: US 6,175,608 B1
(45) Date of Patent: Jan. 16, 2001

(54) PEDOMETER

(75) Inventors: Nathan Pyles, Lake Mills; Joel M. Macht, Reeseville, both of WI (US); Chen Shui-Jung, Taipei (TW)

(73) Assignee: KnowMo LLC, Lake Mills, WI (US)

( * ) Notice: Under 35 U.S.C. 154(b), the term of this patent shall be extended for 0 days.

(21) Appl. No.: 09/181,738

(22) Filed: Oct. 28, 1998

(51) Int. Cl.$^7$ .................................................. G01C 21/00
(52) U.S. Cl. ............................................................ 377/24.2
(58) Field of Search ............................................ 377/24.2

(56) References Cited

U.S. PATENT DOCUMENTS

| | | |
|---|---|---|
| 4,053,755 | 10/1977 | Sherrill . |
| 4,144,568 | 3/1979 | Hiller et al. . |
| 4,220,996 | 9/1980 | Searcy . |
| 4,223,211 | 9/1980 | Allsen et al. . |
| 4,334,190 | 6/1982 | Sochaczevski . |
| 4,337,529 | 6/1982 | Morokawa . |
| 4,371,945 | 2/1983 | Karr et al. . |
| 4,387,437 | 6/1983 | Lowrey et al. . |
| 4,460,823 | 7/1984 | Ruehlemann . |
| 4,466,204 | 8/1984 | Wu . |
| 4,510,704 | 4/1985 | Johnson . |
| 4,560,861 | 12/1985 | Kato et al. . |
| 4,566,461 | 1/1986 | Lubell et al. . |
| 4,578,769 | 3/1986 | Frederick . |
| 4,651,446 | 3/1987 | Yukawa et al. . |
| 4,703,445 | 10/1987 | Dassler . |
| 4,741,001 | 4/1988 | Ma . |
| 4,763,287 | 8/1988 | Gemaeuser et al. . |
| 4,771,394 | 9/1988 | Cavanagh . |
| 4,830,021 | 5/1989 | Thornton . |
| 4,855,942 | 8/1989 | Bianco . |
| 4,962,469 | 10/1990 | Ono et al. . |
| 5,033,013 | 7/1991 | Kato et al. . |
| 5,065,414 | 11/1991 | Endou et al. . |
| 5,117,444 | 5/1992 | Sutton et al. . |
| 5,164,967 | 11/1992 | Endo et al. . |
| 5,475,725 | 12/1995 | Nakamura . |
| 5,476,427 | 12/1995 | Fujima . |
| 5,485,402 | 1/1996 | Smith et al. . |
| 5,490,816 | 2/1996 | Sakumoto . |
| 5,516,334 | 5/1996 | Easton . |
| 5,526,290 | 6/1996 | Kanzaki . |
| 5,583,776 | 12/1996 | Levi et al. . |
| 5,720,200 | 2/1998 | Anderson et al. . |
| 5,724,265 | 3/1998 | Hutchings . |
| 5,891,042 * | 4/1999 | Sham et al. ........................... 600/483 |
| 5,899,963 | 5/1999 | Hutchings . |
| 5,976,083 | 11/1999 | Richardson et al. . |
| 6,018,705 | 1/2000 | Gaudet et al. . |

FOREIGN PATENT DOCUMENTS 0 119 009 A1   9/1983   (EP) .

OTHER PUBLICATIONS

PCT/ISA/210—International Search Report received Mar. 20, 2000, 4 pgs.
PCT/IPEA/408, Written Opinion received Aug. 7, 2000, 5 pgs.

* cited by examiner

Primary Examiner—Margaret R. Wambach
(74) Attorney, Agent, or Firm—Lathrop & Clark LLP

(57) ABSTRACT

The pedometer having improved accuracy by calculating actual stride lengths of a user based on relative stride rates. The pedometer includes a waist or leg mounted stride counter, a transmitter for transmitting data to a wrist-mounted display unit, and a data processor for calculating necessary base units and actual stride rates and lengths. The pedometer can also interact with a heart monitoring device.

33 Claims, 1 Drawing Sheet

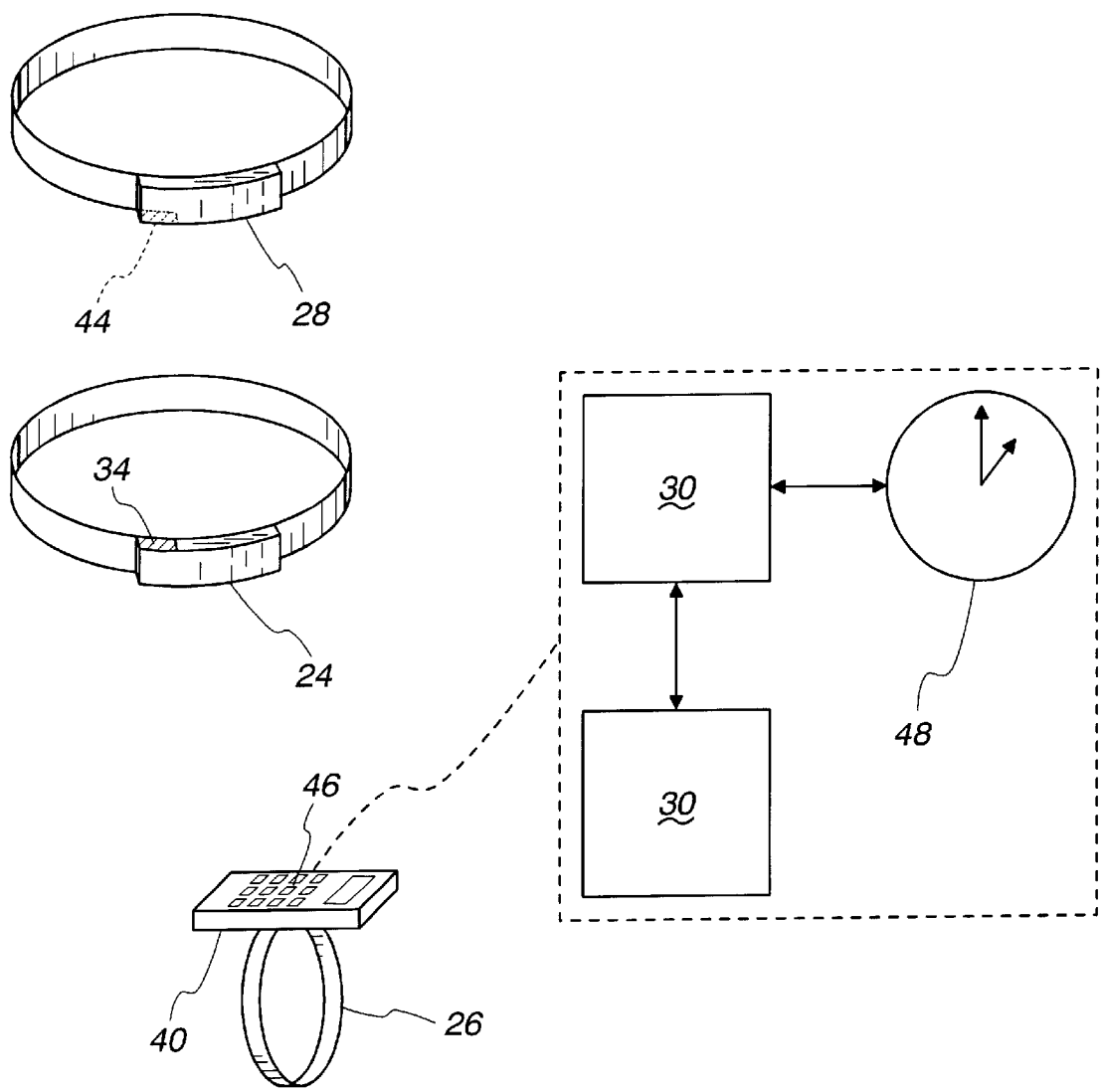

PEDOMETER

FIELD AND BACKGROUND OF THE INVENTION

The present invention relates generally to pedometers having a waist mounted stride-counting device and transmitter, and a wrist-mounted receiver and display. The invention also relates to a distance calculation device that calculates a distance walked or run based on an algorithm that converts a base stride length and a base stride rate to an actual stride length for use in calculating the distance traveled.

Pedometers are known which include devices or algorithms for determining the distance a person travels on foot. For example, U.S. Pat. No. 4,371,945 discloses an electronic pedometer that calculates distance by electronically measuring the length of each stride taken by a user. Stride length is measured by ultrasonic waves generated by an ultrasonic module strapped to one leg and an ultrasonic detector worn on the other leg. A program compensates for a variety of measurement errors and the results are displayed on a wrist-mounted display after being transmitted by VHF waves from the leg to the wrist.

U.S. Pat. No. 4,771,394 discloses a computer shoe with a heel-mounted electronic device with an inertia footstrike counter, a timer, a sound generating device, a battery, and a gate array for counting time and footstrikes to calculate distance and running time as a function of stride time. Although recognizing the important relationship of stride length and foot speed, the shoe in this patent requires data from at least 15 test runs or walks and the data must be user-entered in pairs of footstrikes and elapsed time to cover a pre-determined distance. Further, user adjustments of time must be performed to accommodate start and stop times, and the number of counted footstrikes is increased one percent to overcome inherent errors in the inertia step counter. The shoe-mounted device is subject to damage from impact, dirt, and water, and requires a stay-at-home computer with which to interface. There is no means disclosed to transmit data to a wrist-mounted display device or an "on-board" computing device that provides "real time" data to a runner.

U.S. Pat. No. 4,855,942 discloses a pedometer and calorie measuring device that includes a wrist-mounted step counter and a fixed stride length to calculate distance traveled. Wrist-mounted step counters are known to be inaccurate because they assume a step for every arm movement. Even with error correction, such a device will provide less accurate step counts than a leg or waist-mounted counter. Further, fixed stride lengths do not take into account the fact that stride length varies with rate of movement.

U.S. Pat. No. 5,117,444 discloses a pedometer and calibration method with two calibration modes. First, a user travels a predetermined "half-distance" for the device to count and store the number of strides in that distance. Next, the user travels a second distance with the step counter comparing actual steps to the steps in memory and a current trip memory are incremented by a tenth of a "whole unit" distance. There is no correlation between stride length and stride rate which requires the user to re-calibrate the device when walking as opposed to running.

U.S. Pat. No. 5,475,725 discloses a pulse meter with pedometer function to determine pace and pulse rate of a user. The meter uses pulse wave base data compared to actual pulse wave data rates.

U.S. Pat. No. 5,476,427 discloses a pace display device utilizing a base rate for traveling pre-set distances in successive trails. The device calculates step counts and rates, and compares actual step count rates to display data to a user for comparison of present running rates to previous rates.

Thus, there is a need for a simple, but highly accurate, pedometer that displays distance traveled, pace, speed, heart rate, and other important information on an easily read wrist-mounted device.

SUMMARY OF THE INVENTION

The present invention overcomes problems and shortcomings in the prior art by providing a device that includes a waist, chest, or leg-mounted stride counting device, a transmitter, and a wrist-mounted receiver/display device that provides highly accurate travel distances and other information. The device includes a computer that stores base stride length and rate data from traveling a pre-determined distance and compares that to actual stride rate data to calculate actual distance traveled, speed, and pace. The invention recognizes the interdependency of stride length and stride rate and uses that relationship to provide superior distance-calculating accuracy.

The invention also provides for improved display of relevant data on a wrist-mounted display that receives digital signals from devices worn on other body parts such as legs, waist, and chest. Transmitters that can send coded signals are desirable because they will not interfere with similar devices worn by other users in the vicinity.

The accuracy of the device is enhanced by the use of an algorithm that adjusts a base stride length based on actual stride rates. The algorithm is defined as:

$$\text{Actual Stride Length} = \text{Base Stride Length} + \text{Base Stride Length} * (((\text{Actual Stride Rate} - \text{Base Stride Rate})N)/\text{Base Stride Rate});$$

where N is either an average value or a derived value from a plurality of samples.

The invention also includes a method for calculating an actual stride length including steps of timing a first user run of a predetermined distance; counting the total number of strides in the user first run; dividing the first run distance by the stride count to obtain a base stride length; dividing the stride count by the first run time to obtain a base stride rate; counting strides during a user's second run to obtain an actual stride rate; calculating the actual stride length using the formula:

$$\text{Actual Stride Length} = \text{Base Stride Length} + \text{Base Stride Length} * (((\text{Actual Stride Rate} - \text{Base Stride Rate})N)/\text{Base Stride Rate});$$

wherein N is an average value or a derived value.

The average value method can be refined by comparing Base Stride Rate to Actual Stride Rate to determine a percentage difference; and using N=1 when the Actual Stride Rate $\leq$ Base Stride Rate*1.02 and using N=3 when Actual Stride Rate>Base Stride Rate*1.02. A preferred embodiment uses a plurality of sample runs over known distances to derive an accurate N value for each individual.

BRIEF DESCRIPTION OF THE DRAWINGS

FIG. 1 is a schematic diagram of a pedometer in accordance with the present invention.

DETAILED DESCRIPTION OF THE DRAWINGS

As illustrated in FIG. 1, the present invention is directed to an improved pedometer 20 including: a waist, chest, or leg mounted stride counter 24, and a wrist or waist mounted display unit 26. An optional chest-mounted heart monitor 28 can be included. All of the device components are mounted in suitable housings. The pedometer 20 includes a data processor 30 that is mounted in the same housing as either the step counter 24 or the display unit 26.

The step counter 24 is an inertia device that counts the number of steps a user takes. The number of steps is transmitted to a data archive 32 either directly or via a transmitter 34. The data archive 32 is mounted in the housing with the step counter 24 or the display 26.

The transmitter 34 is mounted in the step counter housing and is preferably an Rf telemetric signal transmitter with a 30 inches to 36 inches transmission range. Alternately, the transmitter is a wireless or wired digital transmitter with a coding function to limit or eliminate interference with other similar devices. The wireless transmission range is set between 30 inches and 36 inches to provide adequate range to transmit signals from a user's waist to wrist, but not so far as to cause interference with other Rf or digital devices in the vicinity.

The transmitter 34 transmits either raw data or calculated distances, pace, etc. to a wrist-mounted display unit receiver 40. The receiver 40 relays a raw data signal to the data processor 30 or a calculated data signal directly to the display panel 42, such as an LCD or LED.

Similarly, the heart rate monitor 28 includes a transmitter 44 that transmits heart rate data to the display unit 26. The heart monitor transmitter 44 can transmit at the same or a different frequency as the stride counter 24, and to the same or a different receiver in the display unit 26. The heart rate transmitter 44 is preferably Rf, but can be digital for the reasons stated above. The range of the heart rate transmitter 44 should also be between 30 inches and 36 inches to ensure effective communication with the receiver while limiting outside interference.

The data processor 30 can also include a programmable logic controller, a personal computer, a programmable read-only memory, or other suitable processor. The data processor 30 includes a data archive 32 to store historic data on stride length and pace to be used in an algorithm for calculating actual distances, speed, and rate for real-time conversion of data to useful information for a user.

The data processor 30 can also include closed loop or fuzzy logic programming to continually or periodically replace the base stride rate and length with recently calculated stride rates and lengths so that long term conditioning trends are accommodated in the base stride archive. Incorporating trend capabilities may further enhance accuracy of the distance and pace calculations.

The display unit 26 also includes an operator interface 46 such as a key pad, button, knob, etc. that enables the user to start and stop a clock 48 (or stop watch) and activate various use modes within the pedometer, such as a sampling mode and operation mode.

One option for using the pedometer 20, requires the user to operate a "sampling mode" and begin walking or running a pre-determined distance such as a mile or 1600 meters, preferably on a running track of a known size. Upon completion of the distance, a stop button on the operator interface 46 is pushed. The data processor 30 is programmed to then divide the distance by the number of strides counted to calculate an average stride length. This value is stored in the data archive 32 as the "Base Stride Length."

Also, the data processor 30 is programmed to divide the number of strides by the time of the run or walk as measured by the clock 48 to arrive at a "Base Stride Rate."

The data processor 30 preferably includes programming that queries the user about the distance to be run during the sampling mode. By providing options or enabling the use of any distance during the sampling mode, the pedometer 20 provides maximum flexibility for use by people of various physical conditions, or having access to courses of different known distances. Thus, a user may be queried to input a distance to be used in the sampling mode and then be given a list of options such as 400 meters, 440 yards, 1600 meters, or one mile, or be asked to simply input any distance known to the user that will be traveled during the sampling mode.

The present invention makes full use of the relationship between a faster rate of travel and longer stride lengths. In other words, the faster a user is moving, the longer will be the stride length. Over the course of the run or walk, the user's step rate and, therefore, stride length will change and the user will cover more ground when moving fast and less ground when moving slow.

Clearly, using a fixed average stride length in calculating distance traveled will result in errors using prior pedometers. This is particularly true if a user changes pace, or improves conditioning and speed to the point where the average stride length over a given run increases dramatically. The error compensators in prior devices do not adjust for changes in pace. With the old devices, a user needed to re-calibrate periodically to be close to getting an accurate reading, and could not change pace during a workout without decreasing accuracy.

To make the correction, the user activates a "Use Mode" in which the data processor 30 calculates an Actual Stride Rate based on data from the stride counter 24 and the clock 48. For example, an Actual Stride Rate can be calculated every five seconds without the user doing more than activating the "Use Mode" button, while all the calculations are performed by the data processor automatically. The percentage change between the Actual Stride Rate and the Base Stride Rate is then computed by the data processor 30 to determine an Actual Stride Length. Again, if the Actual Stride Rate is greater than the Base Stride Rate, the Actual Stride Length is longer than the Base Stride Length. If the Actual Steps Per Second is lower than the Base Steps Per Second, the Actual Stride Length is shorter than the Base Stride Length. The algorithm below provides a means for comparing the Actual and Base Stride rates to arrive at an accurate Actual Stride Length.

First, a comparison between the Actual Stride Rate and the Base Stride Rate is made to determine whether Actual Stride Rate is less than or equal to Base Stride Rate multiplied by 1.02. Stride Length is calculated by:

$$\text{Actual Stride Length} = \text{Base Stride Length} + \text{Base Stride Length} * (((\text{Actual Stride Rate} - \text{Base Stride Rate})N)/\text{Base Stride Rate})$$

Where: N=1 when Actual Stride Rate is less than or equal to Base Stride Rate multiplied by 1.02, and N=3 when Actual Stride Rate is greater than Base Stride Rate multiplied by 1.02, although other N values in the range of one to three can be used.

The above algorithm is accurate for heel to toe activities such as walking or jogging, but is less accurate for sprinting (toe only).

A third method of calculating actual stride length uses three separate run or walk samples at three different paces. This is the most accurate option. With this method, the N values are unique for each individual. By deriving an N value for each individual, this value more accurately reflects the actual change in stride length with a change in pace. After a proper warmup, the user completes a sample run or walk on the track at a normal pace. This first sample S1, will establish the Base Stride and the Base Steps Per Second.
S1 Sample S1 Stride=Base Stride=Distance/Number of Steps S1 Steps Per Second or S1 Steps Per Second=Base Steps Per Second=Number of Steps Per Second Following completion of the first run or walk at normal pace, the user runs or walks the same course and the same distance at a faster run or walking pace, but not a sprinting pace. The user should not run on his toes, but maintain the normal heel to toe jogging style. This is the S2 sample. The purpose of the S2 sample is to calculate an N2 value for each individual which reflects the effect an increase in Steps Per Second has on this individual's stride length. Some individual's steps will lengthen more than others as Steps Per Second increases, and by finding the value for N2, this relative increase can be quantified for a more accurate and customized algorithm for each individual.
S2 Sample To find the N2 value, which will be used by the algorithm when Actual Steps Per Second>Base Steps Per Second N2=((S2 Stride*S1 Steps Per Second)−(S1 Stride*S1 Steps Per Second))/(S1 Stride (S2 Steps Per Second−S1 Steps Per Second))

This value can be calculated since the distance is known, and both a Fast Stride Length (S2 Stride) and a Fast Steps Per Second (S2 Steps Per Second) can be calculated from the second sample.

Following completion of the fast run or walk, the user runs the same course and the same distance at a slower than normal run or walking pace. This pace cannot exceed the first sample pace. This is the S3 sample. The purpose of the S3 sample is to calculate an N3 value for each individual which reflects the effect a decrease in Steps Per Second has on this individual's stride length. Some individual's steps will shorten more than others as Steps Per Second decreases, and by finding the value for N3, this relative decrease can be quantified for a more accurate and customized algorithm for each individual.
S3 Sample To find the N3 value, which will be used by the algorithm when Actual Steps Per Second<Base Steps Per Second.

N3=((S3 Stride*S1 Steps Per Second)−(S1 Stride*S1 Steps Per Second))/(S1 Stride (S2 Steps Per Second−S1 Steps Per Second))

This value can be calculated since the distance is known and both a "Slow" Stride Length (S3 Stride) and a "Slow" Steps Per Second (S3 Steps Per Second) can be calculated from the third sample.

Once these three samples are completed and the information automatically calculated and stored in the data processor 30, then the following formula can be used for the most accurate measurements of speed and distance.

If: Actual Steps Per Second is less than or equal to Base Steps Per Second
Then:

Stride Length=Base Stride+Base Stride*(((Actual Steps Per Second−Base Steps Per Second)N)/Base Steps Per Second)

And N=N3 (Stored Value)

If: Actual Steps Per Second>Base Steps Per Second
Then:

Stride Length=Base Stride+Base Stride*(((Actual Steps Per Second−Base Steps Per Second)N)/Base Steps Per Second)

And N=N2 (Stored Value)

This third option for calculating stride length, and subsequently distance, speed, and pace, is a far more accurate method than a fixed stride length pedometer. This device and method are also practical, convenient, and has a relatively low manufacturing cost. If an individual's running or walking style is progressing with training and practice (as seen by significantly improved times), then it may be beneficial for them to recalibrate their device by repeating the three samples every 3 to 6 months. If there are no significant improvements in time, then recalibration is not necessary.

It is noted that any single stride length or pace discussed above can in fact be an average of a plurality of stride lengths or rates from test runs to further refine accuracy in the calculations of actual stride data.

Other variations on this device could also incorporate an altimeter which measures changes in elevation. The stride length could then be adjusted (shortened) when elevation is increasing, and lengthened when elevation is decreasing. This adjustment could be done with an average value, as we used in setting option 2, or with a derived value by running or walking over a known distance on a hilly course. This device can use two batteries so that the calibration data is not lost when the batteries are replaced one at a time.

Once the actual stride length is calculated for a given period of time, the value can be multiplied by the number of strides in that period to obtain a total distance for that period to be stored in a data archive file for that particular walk or run and added to other actual stride lengths or distances for other periods in which stride length was calculated. When the run or walk is completed, the user engages the operator interface 46 to indicate that a total distance is to be displayed on the display unit. Preferably, there is continual display of the distance traveled.

As a result of accurately calculating distance traveled, the pedometer 20 also has the capability of calculating speed in miles per hour, for example or pace in minutes per mile, including average speed and pace over the course of that particular walk or run. Further, the pedometer 20 can include a port for coupling to a separate personal computer or computing device to create larger training histories, trends, etc.

Additional features can include stop watches, day, date and time displays, as well as, heart rate displays as discussed above. Also, it will be understood that all distances and time periods used above can be varied in length and units of measure (English, metric, seconds, minutes, hours, etc.).

The foregoing detailed description is provided for clearness of understanding only and no unnecessary limitations therefrom should be read into the following claims.

What is claimed is:

1. A pedometer comprising:
a step counter mountable on a user first body portion;
a transmitter in communication with the step counter to generate a signal corresponding to each step and transmit the signal;
a receiver mountable on a user second body portion to receive the signal transmitted from the transmitter and use the signal to calculate a distance traveled;
a heart rate monitor; and
a second transmitter in communication with the heart rate monitor to transmit a signal corresponding to a heart rate monitored by the heart rate monitor to the receiver and display the calculated heart rate, wherein the heart rate monitor and the transmitter are mounted in a single chest-mount housing.

2. A pedometer comprising:

a step counter mountable on a user first body portion;

a transmitter in communication with the step counter to generate a signal corresponding to each step and transmit the signal; and a receiver mountable on a user second body portion to receive the signal transmitted from the transmitter and use the signal to calculate a distance traveled, wherein the pedometer includes a data processor programmed to calculate the distance traveled by multiplying the number of strides taken by a stride length that varies according to a rate at which strides are taken by:

timing a user first run of a predetermined distance;

counting the total number of strides in the user first run;

dividing the first run distance by the stride count to obtain a base stride length;

dividing the stride count by the first run time to obtain a base stride rate;

counting strides in a period of time during a user second run to obtain an actual stride rate;

calculating the actual stride length using the formula:

Actual Stride Length=Base Stride Length+Base Stride Length*(((Actual Stride Rate−Base Stride Rate)$N$)/Base Stride Rate);

where N is in the range of between 1 and 3.

3. The pedometer of claim 2, wherein the pedometer is further programmed to perform the steps of:

comparing the actual stride rate to the base stride rate; and calculating the actual stride length using N=1 when the actual stride rate is less than or equal to the base stride rate multiplied by 1.02.

4. The pedometer of claim 2, wherein the pedometer is further programmed to perform the steps of:

comparing the actual stride rate to the base stride rate; and calculating the actual stride length using N=3 when the actual stride rate is greater than the base stride rate multiplied by 1.02.

5. A pedometer comprising:

a step counter;

a transmitter in communication with the step counter to generate a step count signal corresponding to each step and transmit the step count signal; and a receiver mountable on a user body portion to receive the step count signal transmitted from the transmitter; and a data processor programmed to use the step count signal to calculate a stride rate and a stride length from a plurality of walks or runs each over a known distance to generate a range of corresponding strides rates and stride lengths, and in subsequent walks or runs, calculate an actual stride rate from the number of strides counted by the step counter over a unit of time, compare the actual stride rate with the range of corresponding generated stride rates and stride lengths, and therefrom, calculate an actual stride length to be used in calculating an actual distance traveled.

6. The pedometer of claim 5, wherein the transmitter and the receiver communicate via wireless transmission.

7. The pedometer of claim 5, wherein the transmitter and the receiver communicate via a wire.

8. The pedometer of claim 5, wherein the step count signal is digitally coded.

9. The pedometer of claim 5, wherein the transmitter transmits the signal a wireless distance in the range of zero to thirty-six inches.

10. The pedometer of claim 5, wherein the receiver is mountable on a user's wrist.

11. The pedometer of claim 5, wherein the receiver processes the step count signal and displays the distance traveled on a viewing screen.

12. The pedometer of claim 5, wherein the step counter is mountable on a user's leg.

13. The pedometer of claim 5, and further comprising:

a heart rate monitor; and a second transmitter in communication with the heart rate monitor to transmit a heart rate signal corresponding to a heart rate monitored by the heart rate monitor to the receiver and display the calculated heart rate.

14. The pedometer of claim 13, wherein the heart rate signal is at a different frequency than the step count signal.

15. The pedometer of claim 13, wherein the heart rate monitor is mountable to a user's third body portion.

16. The pedometer of claim 13, wherein the heart rate monitor and the step counter are mounted in a single chest-mount housing.

17. The pedometer of claim 5, wherein the data processor is programmed to calculate an the distance traveled actual stride length of a user by performing the steps of:

timing a user first run of a predetermined distance;

counting the total number of strides in the user first run;

dividing the first run distance by the stride count to obtain a base stride length;

dividing the stride count by the first run time to obtain a base stride rate;

counting strides in a period of time during a user second run to obtain an actual stride rate;

calculating the actual stride length using the formula:

Actual Stride Length=Base Stride Length+Base Stride Length*(((Actual Stride Rate−Base Stride Rate)$N$)/Base Stride Rate);

where N is in the range of between 1 and 3.

18. The pedometer of claim 5, wherein the pedometer is further programmed to perform the steps of:

comparing the actual stride rate to the base stride rate; and calculating the actual stride length using N=1 when the actual stride rate is less than or equal to the base stride rate multiplied by 1.02.

19. The pedometer of claim 5, wherein the pedometer is further programmed to perform the steps of:

comparing the actual stride rate to the base stride rate; and calculating the actual stride length using N=3 when the actual stride rate is greater than the base stride rate multiplied by 1.02.

20. A pedometer programmed to calculate an actual stride length of a user by performing the steps of:

timing a user first run of a predetermined distance to obtain a user first run time;

counting a total number of strides in the user first run;

dividing the first run distance by the total number of strides to obtain a base stride length;

dividing the stride count by the first run time to obtain a base stride rate;

counting strides in a period of time during a user second run to obtain an actual stride rate;

calculating the actual stride length using the formula:

Actual Stride Length=Base Stride Length+Base Stride Length*(((Actual Stride Rate−Base Stride Rate)*N*)/Base Stride Rate);

where N is in the range of between 1 and 3;

calculates the actual stride length using a formula that correlates a specific stride length to a specific stride rate.

21. The pedometer of claim 20, wherein the pedometer is further programmed to perform the steps of:

comparing the actual stride rate to the base stride rate; and calculating the actual stride length using N=1 when the actual stride rate is less than or equal to the base stride rate multiplied by 1.02.

22. The pedometer of claim 20, wherein the pedometer is further programmed to perform the steps of:

comparing the actual stride rate to the base stride rate; and calculating the actual stride length using N=3 when the actual stride rate is greater than the base stride rate multiplied by 1.02.

23. The pedometer of claim 20, wherein the pedometer is further programmed to calculate and display a distance traveled on a viewing screen.

24. The pedometer of claim 20, and further comprising a heart rate monitor mounted in a chest-mount housing.

25. A pedometer programmed to calculate an actual stride length of a user by performing the steps of:

timing a user first run of a predetermined first run distance to obtain a first run time;

counting a total number of strides in the user first run;

dividing the first run distance by the total number of strides in the user first run to obtain a first run stride length and a base stride length;

dividing the first run stride count by the first run time to obtain a first run stride rate and a base stride rate;

timing a user second run of a predetermined second run distance to obtain a second run time;

counting a total number of strides in the user second run;

dividing the second run distance by the total number of strides in the user second run to obtain a second run stride length;

dividing the total number of strides in the second run by the second run time to obtain a second run stride rate;

timing a user third run of a predetermined third run distance to obtain a third run time;

counting a total number of strides in the user third run;

dividing the third run distance by the total number of strides in the user third run to obtain a third run stride length;

dividing the total number of strides in the third run by the third run time to obtain a third run stride rate;

counting strides in a period of time during a user fourth run to obtain an actual stride rate;

calculating the actual stride length using the formula:

Actual Stride Length=Base Stride Length+Base Stride Length*(((Actual Stride Rate−Base Stride Rate)*N*)/Base Stride Rate);

where N is calculated by the formula ((Second Run Stride Length multiplied by First Run Stride Rate)−(First Run Stride Length multiplied by First Run Stride Rate))/(First Run Stride Length multiplied by (Second Run Stride Rate−First Run Stride Rate)) when the Actual Stride Rate is greater than the First Run Stride Rate, and where N is calculated by the formula ((Third Run Stride Length multiplied by First Run Stride Rate)−(First Run Stride Length multiplied by First Run Stride Rate))/(First Run Stride Length multiplied by (Third Run Stride Rate−First Run Stride Rate)) when the Actual Stride Rate is less than or equal to the First Run Stride Rate.

26. The pedometer of claim 25, wherein:

the first run base stride length is an average stride length calculated from a plurality of test runs; and the first run base stride rate is an average base stride rate calculated from the plurality of test runs.

27. The pedometer of claim 25, wherein:

the second run base stride length is an average stride length calculated from a plurality of test runs; and the second run base stride rate is an average base stride rate calculated from the plurality of test runs.

28. The pedometer of claim 25, wherein:

the third run base stride length is an average stride length calculated from a plurality of test runs; and the third run base stride rate is an average base stride rate calculated from the plurality of test runs.

29. The pedometer of claim 25, wherein the second run is at a faster pace than the first walk or run and the third run is at a slower pace than the first walk or run.

30. The pedometer of claim 25, and further comprising:

a data processor mountable on a user body portion to calculate the actual stride length; and a run data display device in communication with the data processor and mountable on a user body portion.

31. The pedometer of claim 25, and further comprising a heart rate monitor mounted in a chest-mount housing.

32. A method for calculating an actual stride length comprising the steps of:

timing a first user run of a predetermined distance to obtain a first run time;

counting a total number of strides in the first user run to obtain a stride count;

dividing the first run time by the stride count to obtain a Base Stride Length;

dividing the stride count by the first run time to obtain a Base Stride Rate;

counting strides in a pre-determined period during a user second run to obtain an Actual Stride Rate;

calculating the actual stride length using the formula:

Actual Stride Length=Base Stride Length+Base Stride Length*(((Actual Stride Rate−Base Stride Rate)*N*)/Base Stride Rate); wherein N is between one and three.

33. The method of claim 32 and further comprising the steps of comparing Base Stride Rate to Actual Stride Rate to determine a percentage difference; and using N=1 when the difference is less than two percent and using N=3 when the difference is greater than or equal to two percent.

* * * * *